United States Patent
Deng et al.

(10) Patent No.: US 9,204,417 B2
(45) Date of Patent: Dec. 1, 2015

(54) MOBILE BROADCAST SIGNAL DEMODULATION CHIP FOR LOCATION DETERMINATION

(75) Inventors: Zhongliang Deng, Beijing (CN); Ziping Lv, Beijing (CN); Huli Shi, Beijing (CN); Weiguo Guan, Beijing (CN); Xie Yuan, Beijing (CN); Risu Na, Beijing (CN); Hemin Li, Beijing (CN); Qifeng Lai, Beijing (CN); Lianming Xu, Beijing (CN)

(73) Assignees: Beijing University of Posts and Telecommunications, Beijing (CN); Beijing Shoukexintong Science & Technology Co., Ltd., Beijing (CN)

( * ) Notice: Subject to any disclaimer, the term of this patent is extended or adjusted under 35 U.S.C. 154(b) by 162 days.

(21) Appl. No.: 13/992,503

(22) PCT Filed: Jun. 8, 2011

(86) PCT No.: PCT/CN2011/075451
§ 371 (c)(1),
(2), (4) Date: Jul. 29, 2013

(87) PCT Pub. No.: WO2012/079346
PCT Pub. Date: Jun. 21, 2012

(65) Prior Publication Data
US 2014/0308972 A1    Oct. 16, 2014

(51) Int. Cl.
*H04W 64/00* (2009.01)
*H04W 4/02* (2009.01)
(Continued)

(52) U.S. Cl.
CPC ............. *H04W 64/00* (2013.01); *G01S 5/0221* (2013.01); *H04B 1/7073* (2013.01); *H04W 4/02* (2013.01); *H04B 2201/70715* (2013.01); *H04W 24/10* (2013.01); *H04W 28/18* (2013.01)

(58) Field of Classification Search
CPC ................................. H04W 64/00; H04W 4/02
USPC ....................................................... 455/456.1
See application file for complete search history.

(56) References Cited

U.S. PATENT DOCUMENTS

| 2003/0052822 A1* | 3/2003 | Rabinowitz et al. | 342/464 |
| 2005/0181809 A1* | 8/2005 | Hild et al. | 455/456.5 |

(Continued)

FOREIGN PATENT DOCUMENTS

| CN | 12134830 A | 2/2001 |
| CN | 101354070 A | 3/2009 |

(Continued)

*Primary Examiner* — Lester Kincaid
*Assistant Examiner* — Daniel G Bassett
(74) *Attorney, Agent, or Firm* — Dilworth & Barrese, LLP.

(57) ABSTRACT

Disclosed is a mobile broadcast signal demodulation chip for location. The demodulation chip includes a reception demodulation and module and a measurement module, where the reception and demodulation module is configured to demodulate a spread spectrum signal for positioning inserted in the header of a time slot or in the header of a transmission frame of a received mobile broadcast signal to acquire navigation message information; and the measurement module is configured to measure and acquire location characteristic parameters. The demodulation chip is not only capable of demodulating broadcast data in a mobile broadcast signal, but also capable of demodulating a spread spectrum signal for positioning-inserted in the header of a time slot or in the header of a transmission frame of a received mobile broadcast signal to acquire navigation message information and location characteristic parameters, thereby effectively improving location accuracy.

16 Claims, 4 Drawing Sheets

(51) Int. Cl.
*G01S 5/02* (2010.01)
*H04B 1/7073* (2011.01)
*H04W 24/10* (2009.01)
*H04W 28/18* (2009.01)

(56) References Cited

U.S. PATENT DOCUMENTS

2006/0116818 A1* 6/2006 Chao et al. .................. 701/211
2009/0115661 A1* 5/2009 Torimoto et al. ............ 342/387
2009/0175379 A1* 7/2009 Rubin et al. ................. 375/295
2009/0286556 A1* 11/2009 Yumoto et al. ............ 455/456.6
2010/0091614 A1* 4/2010 Fujisawa ...................... 368/14
2011/0164690 A1* 7/2011 Ramesh et al. ............ 455/226.1

FOREIGN PATENT DOCUMENTS

CN 102076003 A 5/2011
WO 9620542 A1 7/1996

* cited by examiner

MOBILE BROADCAST SIGNAL DEMODULATION CHIP FOR LOCATION DETERMINATION

This application claims priority to Chinese Patent Application No. 201010602152.0, filed before Chinese Patent Office on Oct. 13, 2010 and entitled "MOBILE BROADCAST SIGNAL DEMODULATION CHIP FOR LOCATION", which is incorporated herein by reference in its entirety.

FIELD OF THE INVENTION

The present invention relates to the field of wireless communications, and particularly to a mobile broadcast signal demodulation chip for location.

BACKGROUND OF THE INVENTION

Location-based services (LBS) are a class of value-added services providing location-based navigation and inquiry services for users over a mobile communication network by using wireless location technologies in cooperation with a Geographic Information System (GIS), which represent a combination of the spatial information technology and the wireless communication technology. In recent years, progress in the radio technology and the wireless local area (WLAN) technology and increase of location service demands promote the development of the location technology. Demands on the LBS are ever increasing. The location technology is extremely important especially in emergencies. Therefore, LBS-based wireless location applications see a broad and promising market.

Currently, LBS include three location methods: Global Positioning System (GPS) location, wireless network location, and hybrid location. The hybrid location is a combination of the GPS location and the wireless network location, and is the most commonly used location method. In the location method provided in the prior art, a mobile terminal is located by matching a group of actual signal parameter information acquired during location, and a base station identifier corresponding to each actual signal parameter information, with statistical values for each group of signal parameters measured in advance in different sub-areas and a base station identifier corresponding to each actual signal parameter information. This improves location speed and accuracy.

However, since signals from a mobile base station have a limited coverage, location accuracy according to the location method in the prior art still needs to be improved. In addition, if a large number of mobile terminals communicate with the base station for location, communication resources will be occupied.

In addition, a conventional demodulation chip has only the function of receiving and demodulating a mobile broadcast signal; and the terminal can be located only when an independent location module is provided thereon. Therefore, the convention chip has poor integration, and is unfavorable to development of a terminal having the high-accuracy outdoor location function.

SUMMARY OF THE INVENTION

The present invention is directed to providing a mobile broadcast signal demodulation chip for location, which is not only capable of demodulating broadcast data in a mobile broadcast signal, but also capable of demodulating a spread spectrum signal for positioning inserted in the header of a time slot or in the header of a transmission frame of a received mobile broadcast signal to acquire navigation message information and location characteristic parameters, thereby effectively improving location accuracy.

In view of the above, an embodiment of the present invention provides a mobile broadcast signal demodulation chip for location, including:

a reception and demodulation module, configured to demodulate a spread spectrum signal for positioning inserted in a header of a time slot or in a header of a transmission frame of a received mobile broadcast signal to acquire navigation message information, where the navigation message information includes a identifier of a mobile broadcast base station; and a measurement module, configured to measure and acquire location characteristic parameters.

Further, the location characteristic parameters include one or a plurality of a signal delay value, a signal delay difference, a signal strength, an angle of signal arrival, from each of mobile broadcast base stations to a terminal.

Preferably, the navigation message information further includes a time correction parameter, the location characteristic parameters are signal delay values or signal delay differences from the mobile broadcast base stations to the terminal, and the demodulation chip further includes an error correction module, configured to correct the signal delay values or the signal delay differences by using the time correction parameter.

Preferably, the demodulation chip further includes a processing module, configured to acquire location data according to the navigation message information acquired by the reception and demodulation module and the location characteristic parameters acquired by the measurement module.

Further, the processing module acquires the location data by using a geometric location technology, and the navigation message information further includes location information of the mobile broadcast base station.

Alternatively, the processing module acquires the location data by using a characteristic matching location technology.

Preferably, the demodulation chip further includes a barometric pressure measurement module and a location data correction module, where the barometric pressure measurement module is configured to measure an atmospheric pressure, and the location data correction module is configured to acquire an altitude value according to the atmospheric pressure measured by the barometric pressure measurement module, and correct, by using the altitude value, the location data acquired by a location data correction module, to acquire final location data.

Preferably, the demodulation chip further includes a communication module, configured to send the navigation message information acquired by the reception and demodulation module and the location characteristic parameters acquired by the measurement module to a network side location server, and receive the location data from the network side location server.

Preferably, if the mobile broadcast signal is a China Mobile Multimedia Broadcasting (CMMB) signal, the spread spectrum signal for positioning fills in a transmitter identifier (TXID) in each of the time slots and in the header of a first synchronization signal; and if the mobile broadcast signal is a Digital Audio Broadcasting (DAB) signal, the spread spectrum signal for positioning fills in a NULL symbol of each of the transmission frames.

The technical solutions according to the embodiments of the present invention achieve the following beneficial effects:

The mobile broadcast signal demodulation chip for location according to the present invention is capable of demodulating a spread spectrum signal for positioning inserted in the header of a time slot or in the header of a transmission frame of a received mobile broadcast signal to acquire navigation message information, and measuring and acquiring location characteristic parameters, thereby effectively improving location accuracy. In addition, the demodulation chip according to the present invention is compatible with an original mobile broadcast system, which does not affect the function of receiving mobile broadcast signals of a terminal in the original system, and is simple to implement.

BRIEF DESCRIPTION OF DRAWINGS

For a better understanding of the technical solutions in the embodiments of the present invention, the accompanying drawings for illustrating the embodiments are briefly described below. Apparently, the accompanying drawings in the following description illustrate only some embodiments of the present invention, and a person skilled in the art can derive other accompanying drawings from these accompanying drawings without any creative efforts.

DETAILED DESCRIPTION OF THE EMBODIMENTS

To make the objectives, technical solutions, and advantages of the present invention clearer, the following describes the embodiments of the present invention in detail below with reference to the accompanying drawings.

Embodiments of the present invention provide a mobile broadcast signal demodulation chip for location, which is not only capable of demodulating broadcast data in a mobile broadcast signal, but also capable of demodulating a spread spectrum signal for positioning inserted in the header of a time slot or in the header of a transmission frame of a received mobile broadcast signal to acquire navigation message information and location characteristic parameters, thereby effectively improving location accuracy.

Figure 1:
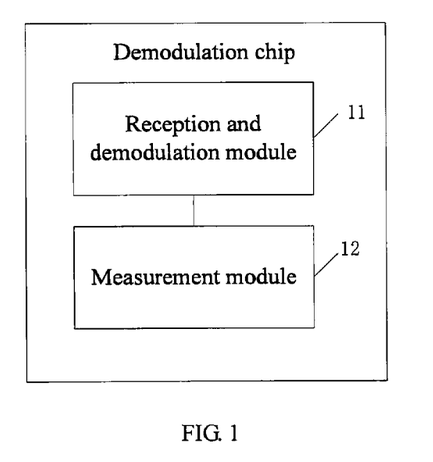
FIG. 1 is a structural block diagram of a mobile broadcast signal demodulation chip for location according to a first embodiment of the present invention.

FIG. 1 is a structural block diagram of a mobile broadcast signal demodulation chip for location according to a first embodiment of the present invention. As illustrated in FIG. 1, the mobile broadcast signal demodulation chip for location according to this embodiment includes a reception and demodulation module 11 and a measurement module 12.

The reception and demodulation module 11 is configured to demodulate a spread spectrum signal for positioning inserted in the header of a time slot or in the header of a transmission frame of a received mobile broadcast signal to acquire navigation message information.

For example, a spread spectrum signal for positioning inserted in the header of a time slot or in the header of a transmission frame of such a received mobile broadcast signal as a CMMB signal, or a DAB signal is demodulated to acquire navigation message information, where the navigation message information includes the identifier of a mobile broadcast base station.

The measurement module 12 is configured to measure and acquire location characteristic parameters.

Further, the location characteristic parameters include one or a plurality of a signal delay value, a signal delay difference, a signal strength, an angle of signal arrival, from each of mobile broadcast base stations to the terminals.

Figure 2:
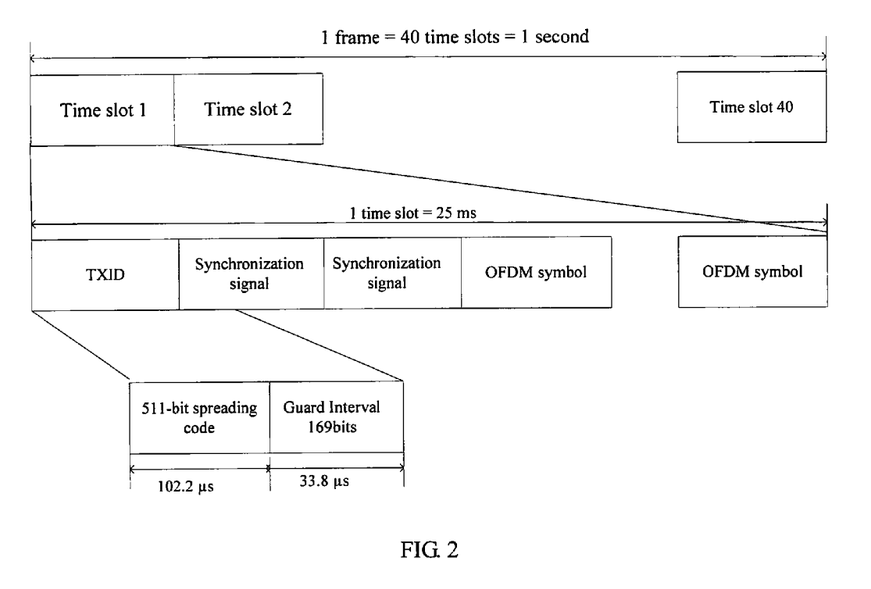
FIG. 2 is a schematic diagram of the frame structure of a CMMB signal.
Figure 3:
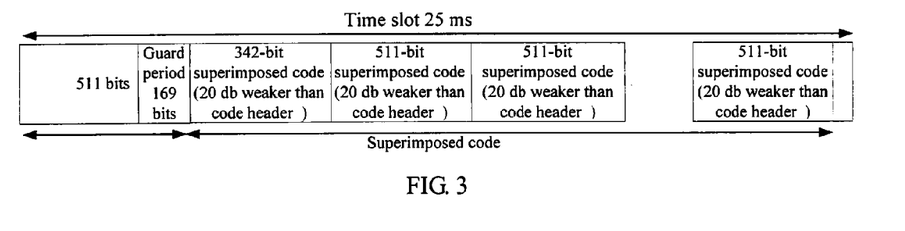
FIG. 3 is a schematic diagram of a spread spectrum signal for positioning insertion manner in the CMMB signal illustrated in FIG. 2

Specifically, if the mobile broadcast signal is a CMMB signal, the spread spectrum signal for positioning fills in a position of a TXID and the front part of a first synchronization signal in each of the time slots. FIG. 2 illustrates a frame structure of the CMMB signal. Each frame (1 s) is divided into 40 time slots, in each time slot (25 ms), the first 136-μs segment (including a 36-μs TXID and a 100-μs synchronization symbol) of CMMB data is replaced with 511-bit Gold code for use in acquired and track demodulation. Since the CMMB signal includes two segments of synchronization signals, and after a spreading code is inserted in the 100-μs time segment of the first synchronization signal, synchronization and channel estimation can still be performed, a Code Division Multiple Access (CDMA) spread spectrum signal for positioning may be inserted in the 36-μs TXID segment and the first 100 μs of the first synchronization signal, 136 μs in total. The first 102.2 μs is filled with a 511-bit Gold code sequence, and the remaining 33.8 μs is used as a guard interval. Another 169 bits are cyclically filled. The 680-bit spreading code is modulated into a 1-bit message, a valid spreading gain is at least 27.08 dB, and the amplitude of spread spectrum signal for positioning is the same as that of a subcarrier of the CMMB data. In addition, the spreading code may also be superimposed in the remaining portion of each time slot of the CMMB signal. FIG. 3 illustrates a superposition manner. Specifically, the superposition spreading code may also use the 511-bit Gold code sequence. The remaining CMMB data portion, except the first 136-μs time segment, in each of the time slots, is cyclically superimposed with the 511-bit Gold code sequence, and the phase of the superimposed code is contiguous with the code phase in the header of the time slot. The code signal is superimposed over the CMMB data in such a manner of 20 dB less than the CMMB signal energy that no interference is caused to normal reception of the CMMB signal.

The spreading code may also be an LAS code or M sequence with zero cross-correlation window greater than 128, and multiple access interferences may be suppressed by using the cross-correlation mitigation algorithm.

During demodulation of a spread spectrum signal for positioning, the location of the header of a time slot may be determined firstly according to a conventional system solution of CMMB, the spread spectrum signal for positioning inserted in the header of the time slot is acquired and demodulated in the header of the time slot, and a location characteristic signal is measured. After the acquired, in the tracking state, long-time correlation accumulation is performed by using consecutively superimposed superposition spreading codes such that measurement accuracy and measurement stability of characteristic information are improved.

Figure 4:
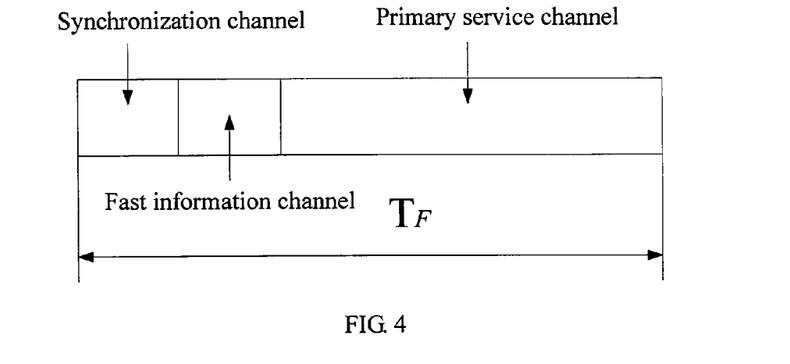
FIG. 4 is a schematic diagram of the channel structure of a DAB signal.
Figure 5:
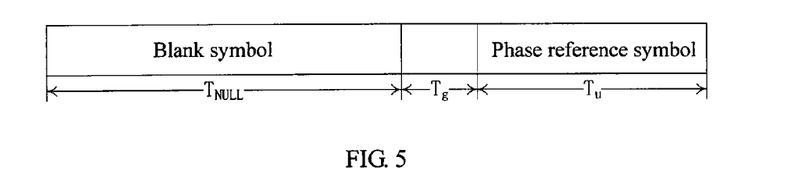
FIG. 5 is a schematic diagram of the frame structure of a synchronization channel of the DAB signal as illustrated in FIG. 4.
Figure 6:
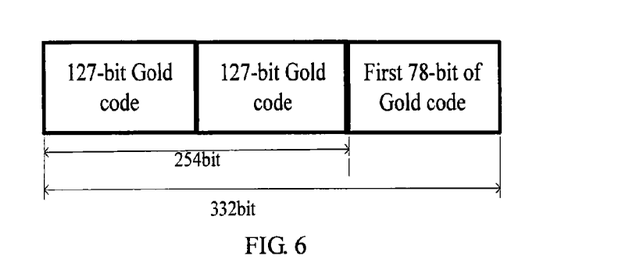
FIG. 6 is a schematic diagram of a spread spectrum signal for positioning insertion manner in the DAB signal illustrated in FIG. 4.

If the mobile broadcast signal is a DAB signal, the spread spectrum signal for positioning fills in a NULL symbol of each of the transmission frames. FIG. 4 illustrates a channel structure of the DAB signal, where a synchronization channel, a fast information channel, and a primary service channel are included. The synchronization channel occupies the first two OFDM symbols in each transmission frame in any transmission mode. As illustrated in FIG. 5, the first OFDM symbol is a NULL symbol with the duration of TNULL, and the second symbol is a phase reference symbol (PRS) with the duration of Ts. Each of transmitters in the transmission sites, within the period of the NULL symbol, transmits transmitter information data in the CDMA mode. Within a Single Frequency Network (SFN), a unique identifier is assigned to each of the transmitters, and different spreading words are assigned to neighboring transmitters. In consideration of multi-path interference, after the transmitter information data is modulated by using the spreading word, the modulated transmitter information data is cyclic-prefix-extended to the duration of TNULL, and the NULL symbol using the synchronization channel is used for data transmission. Further, starting at the start time of the NULL symbol, two segments of 127-bit Gold codes are cyclically filled, and the two segments of 127-bit codes and subsequent 78-bit codes form a 332-bit spreading sequence (a receiver performs demodulation on 254-bit codes, where the first or last 78 bits may be selected for use as a guard period according to actual situations as long as the 245-bit codes are completely demodulated). During demodulation of the NULL symbol, the energy thereof is controlled to be 10 dB less than the DAB signal energy to ensure that a receiving terminal is capable of performing empty energy detection for synchronization of demodulation of the DAB signal, as shown in FIG. 6.

During demodulation of a spread spectrum signal for positioning, the location of the NULL symbol in the header of a transmission frame may be determined firstly according to a conventional system solution of DAB, the spread spectrum signal for positioning inserted in the header of the time slot is acquired and demodulated at the position of the NULL symbol, and a location characteristic signal is measured.

The mobile broadcast signal demodulation chip for location according to this embodiment is capable of demodulating a spread spectrum signal for positioning inserted in the header of a time slot or in the header of a transmission frame of a received mobile broadcast signal to acquire navigation message information, and measuring and acquiring location characteristic parameters, thereby effectively improving location accuracy. In addition, the demodulation chip according to this embodiment is compatible with an original mobile broadcast system, which does not affect the function of receiving mobile broadcast signals of a terminal in the original system, and is simple to implement.

Figure 7:
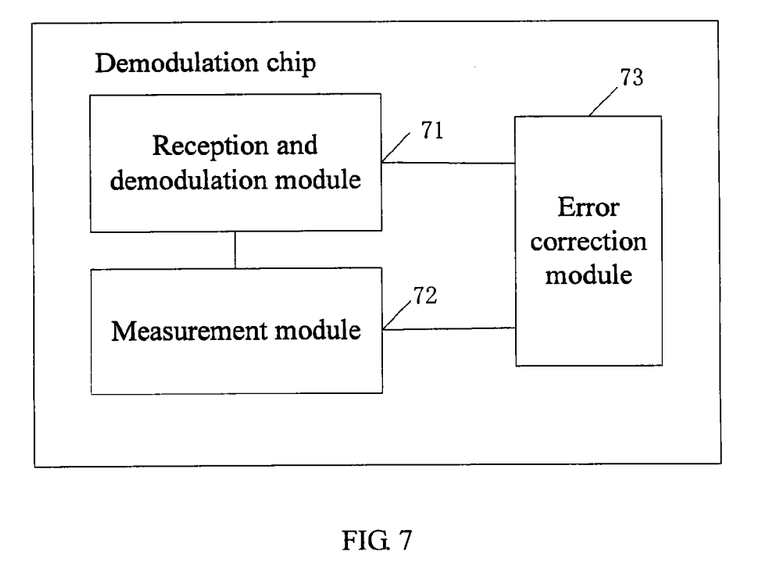
FIG. 7 is a structural block diagram of a mobile broadcast signal demodulation chip for location according to a second embodiment of the present invention.

FIG. 7 is a structural block diagram of a mobile broadcast signal demodulation chip for location according to a second embodiment of the present invention. As illustrated in FIG. 7, the mobile broadcast signal demodulation chip for location according to this embodiment includes a reception and demodulation module 71, a measurement module 72, and an error correction module 73.

The reception and demodulation module 71 is configured to demodulate a spread spectrum signal for positioning inserted in the header of a time slot or in the header of a transmission frame of a received mobile broadcast signal to acquire navigation message information.

For example, a spread spectrum signal for positioning inserted in the header of a time slot or in the header of a transmission frame of such a received mobile broadcast signal as a CMMB signal, or a DAB signal is demodulated to acquire navigation message information, where the navigation message information includes the identifier of a mobile broadcast base station and a time correction parameter.

The measurement module 72 is configured to measure and acquire location characteristic parameters.

Further, the location characteristic parameters include one or a plurality of a signal delay value, a signal delay difference, a signal strength, an angle of signal arrival, from each of mobile broadcast base stations to the terminals.

The error correction module 73 is configured to correct the signal delay value or signal delay difference by using the time correction parameter.

The mobile broadcast signal demodulation chip for location according to this embodiment is capable of demodulating a spread spectrum signal for positioning inserted in the header of a time slot or in the header of a transmission frame of a received mobile broadcast signal to acquire navigation message information, and measuring and acquiring location characteristic parameters, thereby effectively improving location accuracy. In addition, the demodulation chip according to this embodiment is compatible with an original mobile broadcast system, which does not affect the function of receiving mobile broadcast signals of a terminal in the original system, and is simple to implement. Further, the measurement module according to this embodiment uses a signal delay difference as the location characteristic parameter such that an error caused by out-of-sync between a terminal and a base station is eliminated; the error correction module corrects the signal delay difference by using a time correction parameter such that a higher delay characteristic accuracy is acquired and hence location accuracy is improved.

Figure 8:
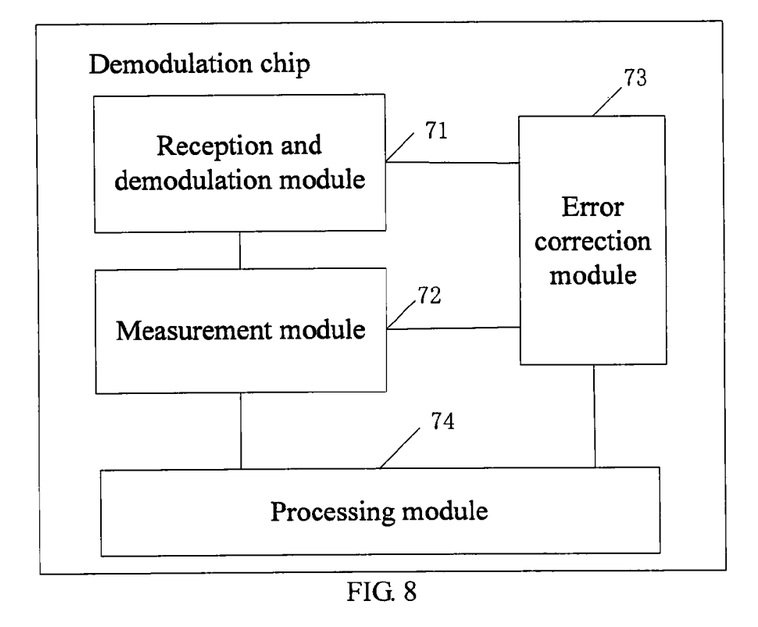
FIG. 8 is a structural block diagram of a mobile broadcast signal demodulation chip for location according to a third embodiment of the present invention.

FIG. 8 is a structural block diagram of a mobile broadcast signal demodulation chip for location according to a third embodiment of the present invention. Different from the mobile broadcast signal demodulation chip for location according to the second embodiment, the mobile broadcast signal demodulation chip for location according to this embodiment further includes a processing module 74.

The processing module 74 is configured to acquire location data according to the navigation message information and location characteristic parameters.

Specifically, the processing module 74 may acquire the location data by using a geometric location technology. In this case, the navigation message information includes at least the identifier of a mobile broadcast base station and location information. The processing module 74 may further acquire the location data by querying in a database by using a characteristic matching location technology.

The mobile broadcast signal demodulation chip for location according to this embodiment is capable of demodulating a spread spectrum signal for positioning inserted in the header of a time slot or in the header of a transmission frame of a received mobile broadcast signal to acquire navigation message information, and measuring and acquiring location characteristic parameters, thereby effectively improving location accuracy. In addition, the demodulation chip according to this embodiment is compatible with an original mobile broadcast system, which does not affect the function of receiving mobile broadcast signals of a terminal in the original system, and is simple to implement.

Figure 9:
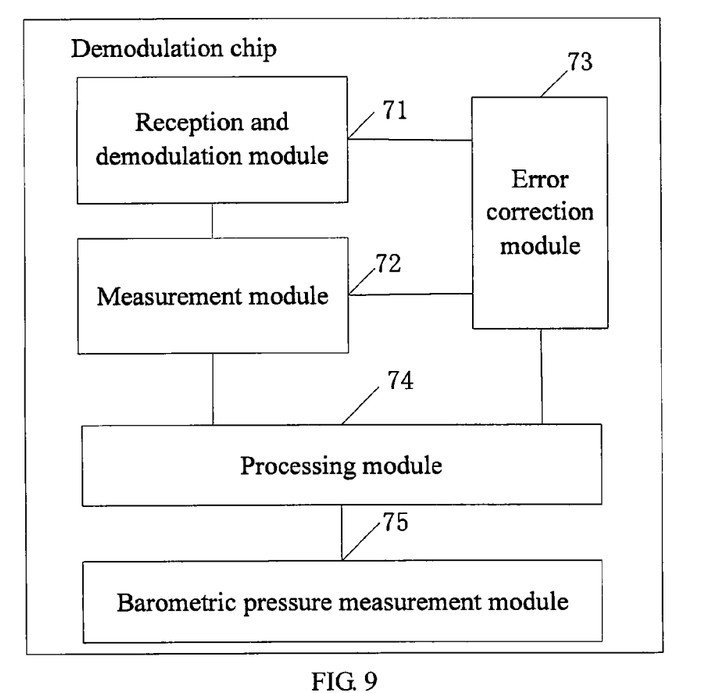
FIG. 9 is a structural block diagram of a mobile broadcast signal demodulation chip for location according to a fourth embodiment of the present invention.

FIG. 9 is a structural block diagram of a mobile broadcast signal demodulation chip for location according to a fourth embodiment of the present invention. Different from the mobile broadcast signal demodulation chip for location according to the second embodiment, the mobile broadcast signal demodulation chip for location according to this embodiment further includes a barometric pressure measurement module 75.

The barometric pressure measurement module 75 is configured to measure an atmospheric pressure and transfer the measured atmospheric pressure to the processing module 74. The barometric pressure measurement module herein may be a barometric pressure sensor.

The processing module 74 is further configured to acquire an altitude value according to the atmospheric pressure measured by the barometric pressure measurement module 75, and correct, by using the altitude value, the location data acquired by the processing module 74 to acquire final location data. The final location data includes horizontal location information and altitude location information, achieving differentiated location in terms of altitude.

Barometric altitude measurement works depending on principles that the atmospheric pressure decreases with increase of the altitude in a gravity field, which is denoted by a definite function relationship. Therefore, the atmospheric pressure may be measured by using a barometric pressure sensor, and then the altitude value is calculated according to a relationship between the atmospheric pressure and the altitude. During measurement, the barometric pressure sensor is used to convert a measured atmospheric pressure into an analog voltage signal for output, and convert, by using V/F conversion, the analog voltage signal output by the barometric pressure sensor into a pulse signal having a specific frequency (the frequency linearly varies with the input voltage). A single-chip microcomputer receives the pulse signal, acquires the number of pulses with a unit time, calculates a corresponding actual atmospheric pressure according to a linear relational expression between voltage and frequency, and gives an altitude indication after data processing, thereby achieving differentiated location in terms of altitude. Finally, location of a user is calculated according to broadcast location coordinates, pseudo ranges, values read from a barometric altimeter, thereby further improving accuracy in indoor complicated location.

Figure 10:
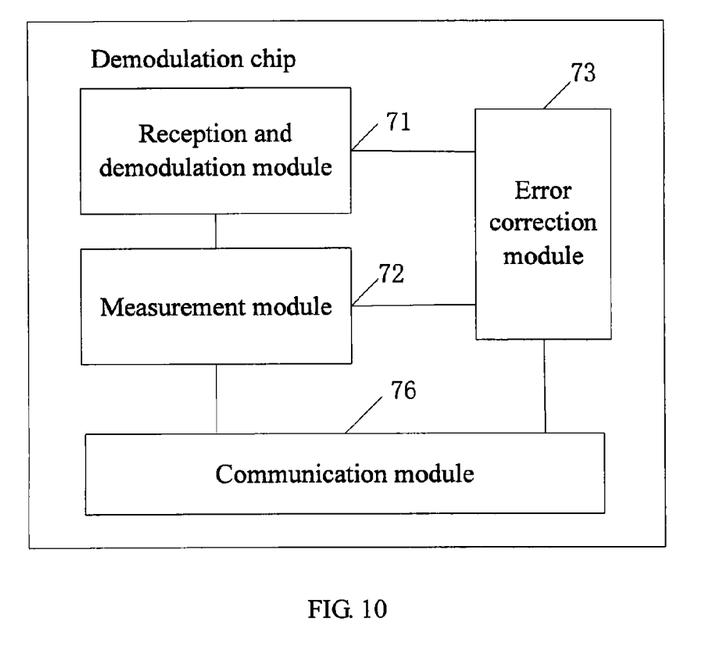
FIG. 10 is a structural block diagram of a mobile broadcast signal demodulation chip for location according to a fifth embodiment of the present invention.

FIG. 10 is a structural block diagram of a mobile broadcast signal demodulation chip for location according to a fifth embodiment of the present invention. Different from the mobile broadcast signal demodulation chip for location according to the second embodiment, the mobile broadcast signal demodulation chip for location according to this embodiment further includes a communication module 76.

The communication module 76 is configured to send the navigation message information acquired by the reception and demodulation module 71 and the location characteristic parameters acquired by the measurement module 72 to a network side location server, and receive the location data from the network side location server.

The location characteristic parameters may be parameters experiencing error correction.

The above-described embodiments are merely preferred ones of the present invention, and are not intended to limit the protection scope of the present invention. Any equivalent replacements or modifications in terms of structure and procedure, made without departing from disclosure of the specification and drawings of the present invention, or used directly or indirectly in the related technical fields should fall within the scope of the present invention.

What is claimed is:

1. A mobile broadcast signal demodulation chip for location determination for a mobile broadcast signal containing audio, video or multimedia content, comprising:
    a reception and demodulation module, configured to demodulate a spread spectrum signal for positioning inserted in a header of a time slot or in a header of a transmission frame of a received mobile broadcast signal to acquire navigation message information, wherein the navigation message information comprises a identifier of a mobile broadcast base station;
    a measurement module, configured to measure and acquire location characteristic parameters; and
    a processing module, configured to acquire location data according to the navigation message information acquired by the reception and demodulation module and the location characteristic parameters acquired by the measurement module,
    wherein the spread spectrum signal for positioning fills in a position of a transmitter identifier and the front part of a first synchronization signal in each of the time slots, and spreading codes are superimposed in the remaining portion of each time slot.

2. The demodulation chip according to claim 1, wherein the location characteristic parameters comprise one or a plurality of a signal delay value, a signal delay difference, a signal strength, an angle of signal arrival, from each of mobile broadcast base stations to a terminal.

3. The demodulation chip according to claim 2, wherein the navigation message information further comprises a time correction parameter, the location characteristic parameters are signal delay values or signal delay differences from the mobile broadcast base stations to the terminal, and the demodulation chip further comprises an error correction module, configured to correct the signal delay values or the signal delay differences by using the time correction parameter.

4. The demodulation chip according to claim 1, further comprising a barometric measurement module, configured to measure an atmospheric pressure and transfer the measured atmospheric pressure to the processing module;
    wherein the processing module is further configured to acquire an altitude value according to the atmospheric pressure measured by the barometric pressure measurement module, and correct, by using the altitude value, the location data acquired by the processing module to acquire final location data.

5. The demodulation chip according to claim 1, wherein the processing module acquires the location data by using a geometric location technology, and the navigation message information further comprises location information of the mobile broadcast base station.

6. The demodulation chip according to claim 1, wherein the processing module acquires the location data by using a characteristic matching location technology.

7. The demodulation chip according to claim 1, further comprising a communication module, configured to send the navigation message information acquired by the reception and demodulation module and the location characteristic parameters acquired by the measurement module to a network side location server, and receive the location data from the network side location server.

8. The demodulation chip according to claim 2, further comprising a processing module, configured to acquire location data according to the navigation message information acquired by the reception and demodulation module and the location characteristic parameters acquired by the measurement module.

9. The demodulation chip according to claim 3, further comprising a processing module, configured to acquire location data according to the navigation message information acquired by the reception and demodulation module and the location characteristic parameters acquired by the measurement module.

10. The demodulation chip according to claim 2, further comprising a communication module, configured to send the navigation message information acquired by the reception and demodulation module and the location characteristic parameters acquired by the measurement module to a network side location server, and receive the location data from the network side location server.

11. The demodulation chip according to claim 3, further comprising a communication module, configured to send the navigation message information acquired by the reception and demodulation module and the location characteristic parameters acquired by the measurement module to a network side location server, and receive the location data from the network side location server.

12. The demodulation chip according to claim 8, further comprising a barometric measurement module, configured to measure an atmospheric pressure and transfer the measured atmospheric pressure to the processing module;

wherein the processing module is further configured to acquire an altitude value according to the atmospheric pressure measured by the barometric pressure measurement module, and correct, by using the altitude value, the location data acquired by the processing module to acquire final location data.

13. The demodulation chip according to claim 8, wherein the processing module acquires the location data by using a geometric location technology, and the navigation message information further comprises location information of the mobile broadcast base station.

14. The demodulation chip according to claim 8, wherein the processing module acquires the location data by using a characteristic matching location technology.

15. The demodulation chip according to claim 9, further comprising a barometric measurement module, configured to measure an atmospheric pressure and transfer the measured atmospheric pressure to the processing module;

wherein the processing module is further configured to acquire an altitude value according to the atmospheric pressure measured by the barometric pressure measurement module, and correct, by using the altitude value, the location data acquired by the processing module to acquire final location data.

16. The demodulation chip according to claim 9, wherein the processing module acquires the location data by using a geometric location technology, and the navigation message information further comprises location information of the mobile broadcast base station.

* * * * *

UNITED STATES PATENT AND TRADEMARK OFFICE
CERTIFICATE OF CORRECTION

Page 1 of 1

PATENT NO. : 9,204,417 B2
APPLICATION NO. : 13/992503
DATED : December 1, 2015
INVENTOR(S) : Zhongliang Deng et al.

It is certified that error appears in the above-identified patent and that said Letters Patent is hereby corrected as shown below:

On the Title Page item 30 Insert

--Dec. 13, 2010  (CN).................................201010602152.0--

Signed and Sealed this
Twenty-sixth Day of January, 2016

Michelle K. Lee
*Director of the United States Patent and Trademark Office*